Feb. 9, 1932.  E. OSTER  1,844,522
PROCESS FOR REFRIGERATION
Filed Dec. 24, 1929

Inventor
Eugene Oster
By Murray
Attorneys

Patented Feb. 9, 1932

1,844,522

UNITED STATES PATENT OFFICE

EUGENE OSTER, OF NORWOOD, OHIO

PROCESS FOR REFRIGERATION

Application filed December 24, 1929. Serial No. 416,238.

An object of this invention is to provide means and a method for quickly congealing various substances.

Another object is to provide a means and method for the stated purpose, that will attain the desired end economically and expeditiously.

Another object is to provide a simple and efficient means and method for the stated purpose.

These and other objects are attained by the means described herein and disclosed in the accompanying drawings, wherein.

Figure 1:
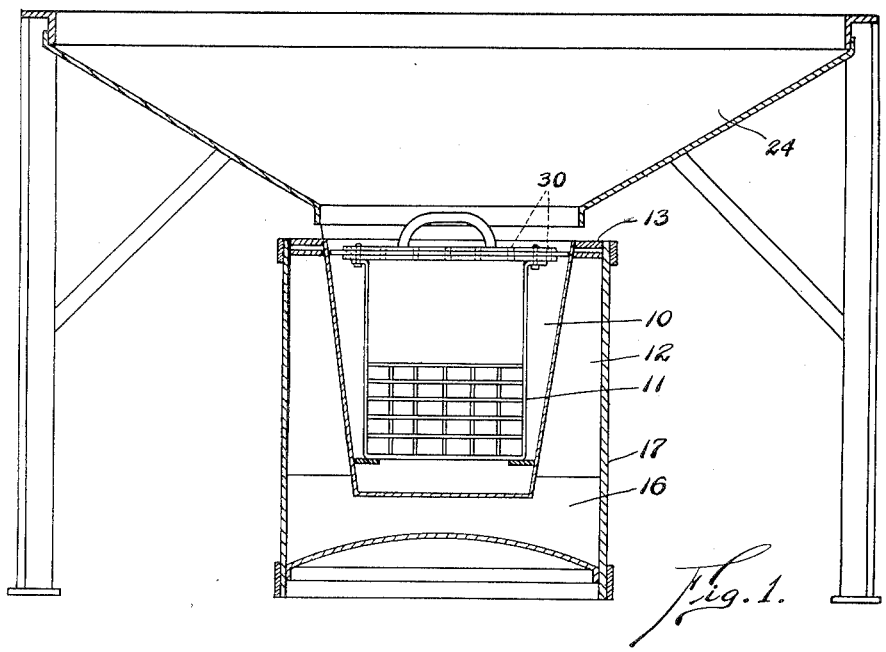
Fig. 1 is a cross sectional view of a bath and container therefor, forming details of the invention.

The means and process about to be disclosed and described may employ various agents, other than those set forth herein. Although the invention disclosed herein is exemplified by the congealing of ice-cream, and by the use of a certain alcohol and agent, viz: solid carbon dioxide, it will be readily evident to one skilled in the art that other low freezing point, preferably non-poisonous fluids having a low viscosity at low temperatures, may be used in lieu of ethyl alcohol (denatured), and that other refrigerants, solid and/or liquid, having the characteristic of releasing a gas for agitating substantially all of the mass in which it may be associated, and which gas may liberate itself from the mass without chemically affecting such mass, may be employed. It is preferable that the refrigerant should have the insulating characteristic of carbon dioxide gas, in that, on liberation thereof from the immersion, the gas may blanket the upper surface of the immersion, thereby thermally insulating same from the warmer attendant atmosphere, and thereby making it possible for operators to work in comfortably temperatured quarters without affecting the temperature of the immersion.

In the preparation of the various frozen articles, for example, ice-cream in various molded forms and shapes, it has been the practice to partly freeze ice-cream. When the ice-cream is still fairly plastic, portions thereof are introduced, manually or otherwise, into molds made of material having thermal conductivity. The molds are then packed in boxes or other containers and solid carbon dioxide or dry ice as it is called, or other refrigerating substance such as cracked ice and salt, is packed around the molds. After about five to fifteen minutes or more, the molds may be opened and the molded ice-cream removed therefrom. Then the molded ice-cream articles are placed into suitable containers or on trays, and are placed in a low temperature atmosphere.

In carrying on commercial manufacture under the stated conditions, it is necessary to have a large number of molds and a given mold can be used but a limited number of times in a given period.

In carrying out the invention disclosed herein, there is provided a receptacle 10, in which is placed a quantity of denatured ethyl alcohol. The quantity of alcohol should be such that it will not overflow the receptacle when one or more molds are immersed therein and such that it will not overflow as a result of the disturbance of the alcohol by the bubbles of carbon dioxide gas. For immersing the molds, a suitable basket, cage or the like, 11, may be employed.

Into the alcohol there is placed solid carbon dioxide or other frigidity attaining substance, until the alcohol substantially ceases to bubble and churn. Thereupon, the molds, each having been charged with ice-cream as previously explained, are placed in the refrigerating batch. After about fifteen (15) to twenty-five (25) seconds, the molds are withdrawn. The molds may then be removed from the basket, and placed on the drain apron 24 formed about and discharging into the receptacle. The molds are then emptied. It may be necessary to dip some of the first opened molds into water to release the articles from the mold. After the first few molds are opened, the remaining molds can generally be opened without dipping same in water, the mold having absorbed sufficient heat to free the articles. The articles may be handled as units and when removed they have a solid outer face, although the interiors or cores thereof may still be fairly soft or plastic. The outer solid face or wall is sufficiently rigid to permit handling of the articles, and they may be packed in containers for delivery or storage, or they may be otherwise stocked in a suitable refrigerator or hardening room, the congealing action continuing centerward of the article until the entire article has attained a substantially uniform consistency or rigidity.

As the molds are introduced into the alcohol, the solid carbon dioxide absorbs heat and assumes a gaseous form, the alcohol churning and bubbling as the gas rises therein. The heat of the molds and their contents is quickly transferred to the alcohol and carbon dioxide, thereby setting the ice cream and quickly congealing the surface of the ice cream article. The alcohol is an effective and prompt heat transmitting agent and provides liquid contact with the entire surface of the mold, and the movement of the carbon dioxide gas upwardly through the alcohol, so agitates or disturbs the alcohol about the mold, that the alcohol acts in much the same way as does a boiling fluid for transferring heat units to an article immersed in such boiling fluid. As soon as the carbon dioxide reaches the top of the alcohol, it forms a film or blanket over the top of the alcohol and protects the alcohol from the atmosphere and thereby precludes heat absorption by the alcohol from the atmosphere.

The container 10 may be suitably packed in thermal insulating material 12 to avoid absorption of heat units through the bottom and side walls. That structure is shown in Fig. 1. The thermal insulating material is preferably sealed as at 13, against moisture to maintain maximum efficiency thereof.

Figure 2:
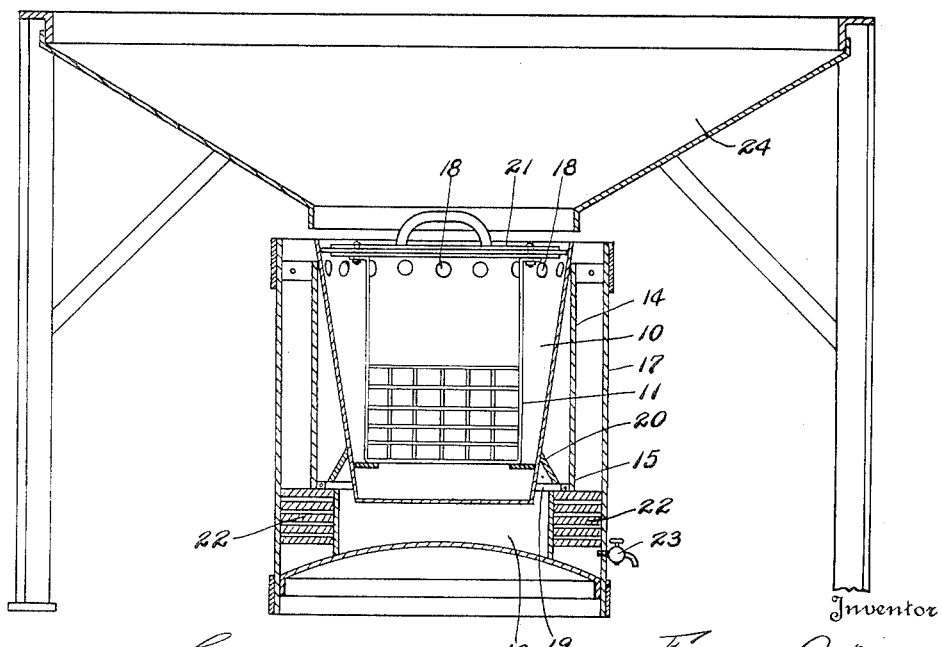
Fig. 2 is a view similar to Fig. 1, showing a modified form thereof.

Another arrangement for insulating the container is shown in Fig. 2, wherein the container, near its top, is provided with openings 18. A depending apron 14 preferably of low thermal conductivity, for example, fiber or rubber, is attached to the upper end of the container. The apron has its lower edge 15 spaced a short distance from the thermal insulating pad 16, which may be of cork. An outer container 17 is provided to contain the receptacle 10. In this form of device, the carbon dioxide passes through the holes 18 and falls to the bottom of and passes below the apron, and then is moved upwardly exteriorly of the apron, as more carbon dioxide is released. The lower edge or end of the apron may be held in fixed relation to receptacle 10 by suitable spaced arms or brackets 19, and between which brackets the gas may pass. An annular baffle 20 may be provided to shed alcohol from the receptacle, between the brackets 19 and outwardly beyond the insulating pad 16. The several layers of expanded metal lath 22, serve to mechanically separate the alcohol spray from the gas. In this way the carbon dioxide is used as an insulating medium after it has functioned as a refrigerating agent, and the separated alcohol can be withdrawn by way of spigot 23 and may be returned into receptacle 10. In this form of device, the basket is preferably carried by a suitable lid or cover 21 for receptacle 10. The lid precludes escape of carbon dioxide from the receptacle, except by passing around the apron. In this way, the coldest carbon dioxide is used as an insulating blanket and the warmest carbon dioxide is exhausted after it has passed upwardly exteriorly of the apron.

In the device shown in Fig. 1, openings 30 may be provided in the lid to permit escape of gas.

The drain aprons 24 return the alcohol to the receptacle, as it drains from the molds. The drain aprons may be of any suitable material. The edge of the lid is preferably of some flexible material, such as rubber, so that it will not interfere with movement of the lid and basket to and from position on the receptacle. It is readily evident that a rigid drain apron or board may be provided, and that a flexible lid may be employed in lieu of a rigid lid. It is also evident that suitable conveyor equipment may be provided for carrying the molds and/or substance to be treated, through the bath. The conveyor should be capable of operation at variable speeds, so that the time of immersion may be varied, it being obvious that the thermal conductivity of various molds and mass to be treated will require subjection of such molds and/or substance to the bath for different periods of time.

When using the process as described herein, in conjunction with molds carrying the material to be frozen, the degree of toxicity of the refrigerant is not particularly important. However, when applying the invention in the freezing of substances by direct immersion of the article in the refrigerant, the use of a non-poisonous refrigerant may be imperative. For example, fish, meats or some other food products may be immersed direct in a refrigerant comprising ethyl alcohol and solid carbon dioxide. The extreme frigidity of the immersion crystallizes the fluids at the surface of the article so quickly, that there is substantially no enlargement of the ice crystals in the article as occurs when water freezes slowly.

In treating some substances, for example, meats and fish, it is generally desirable to permit same to remain in the bath long enough to freeze same to the core, or in some instances at least to freeze same to such extent that the retained heat at the center of the substance is insufficient to effect any appreciable thawing and consequent slow enlargement of the frozen crystals. The slow freezing or crystallization of fluids in such products tends to damage the tissues and often renders the product unsalable. In any event, the quick freezing of the substance, whether completely to the core thereof, or otherwise, permits expeditious handling of the products, and in many cases, preserves the substances to better advantage because there is little opportunity for chemical and/or physical change or reaction that in some instances might be injurious to the substance and/or may affect its preservation.

It has been found that when using the method and apparatus and/or means disclosed herein, that it is possible to obtain sharper mold impressions on such substances as ice-cream. For example, in molds for shaping ice-cream into the form of birds, fruits and the like it was found that by means of this invention the impressions representing feathers, and other peculiarities of configuration incident to such subject matter, were particularly sharply defined as contrasted with articles formed in the same molds, when employing the former and slower process.

There is a preparation comprising carbon dioxide and water in solid form. That substance is also capable of use in connection with the invention. When using such preparation, it should be so employed that contact of the refrigerating agent is established with the entire surface of the mold or the substance to be treated, substantially as typified by the alcohol (denatured or otherwise) and the frigidity providing substance, illustrated by solid carbon dioxide.

In some adaptations of the invention, it might be found to be desirable to provide a conveyor for subjecting the molds or products to the bath. Such conveyor may be of any of the commercial devices such as are employed for carrying various objects, and which conveyors in some instances extend in part through various tanks, vats etc.

What is claimed is:

1. A method of molding and hardening plastic material which consists in placing a plastic mass in a suitable mold, subjecting the surface of the mold to a low temperature to quickly freeze the peripheral part of the mass, removing the mass from the mold and then freezing the remainder of the mass at a slower rate.

2. A method of molding and hardening food substances such as ice-cream, edible ices and sherberts, which consists in bringing such a food substance to a plastic consistency, placing a plastic mass thereof in a suitable mold, subjecting the mold to a low temperature to quickly freeze the peripheral part of the mass, removing the mass from the mold and then freezing the remainder of the mass after its removal from the mold.

3. A method of molding and hardening plastic material which consists in placing a plastic mass in a suitable mold, subjecting the surface of the mold to a low temperature to quickly freeze the peripheral part of the mass, removing the mass from the mold and then freezing the remainder of the mass after removal of the substance from the mold.

4. A method of molding and hardening material which consists in placing a quantity of the material in a suitable mold, subjecting the surface of the mold to a low temperature to quickly freeze a peripheral part of the material for establishing a substantially rigid outer shell or casing of such material, removing the material so formed from the mold and then completing fixation of the material by further freezing the material after such removal thereof, from the mold.

In testimony whereof, I have hereunto subscribed my name this 19th day of December, 1929.

EUGENE OSTER.